R. SULZER.
HEATING APPARATUS.
APPLICATION FILED MAR. 4, 1911.
1,083,343.
Patented Jan. 6, 1914
3 SHEETS—SHEET 3.
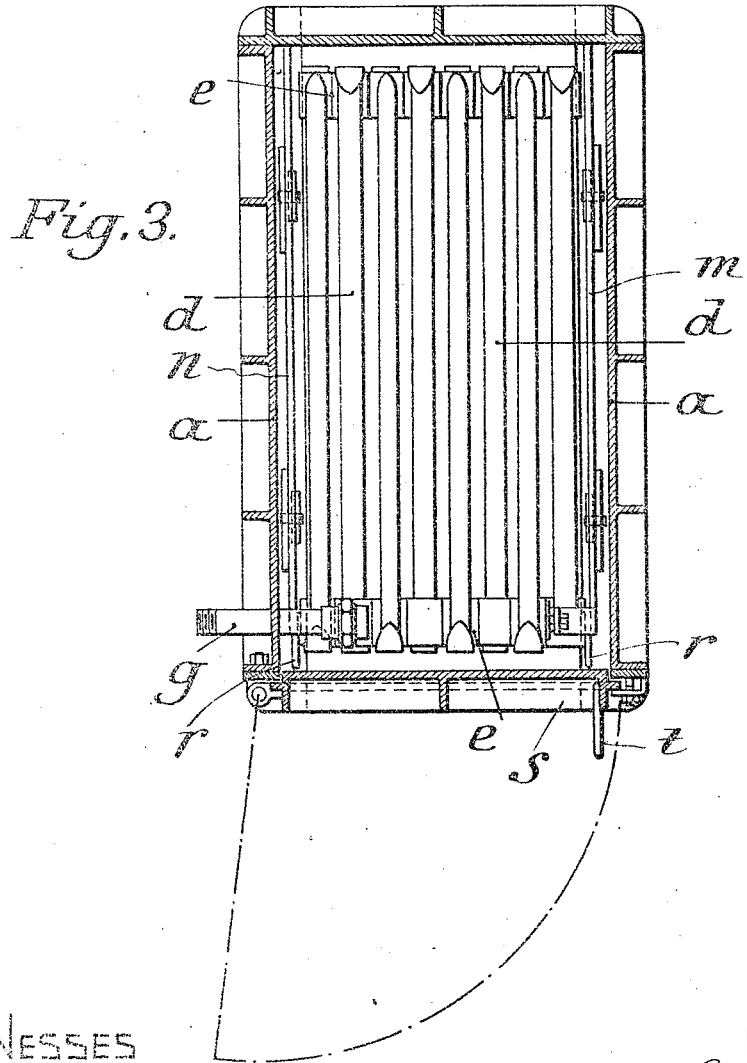

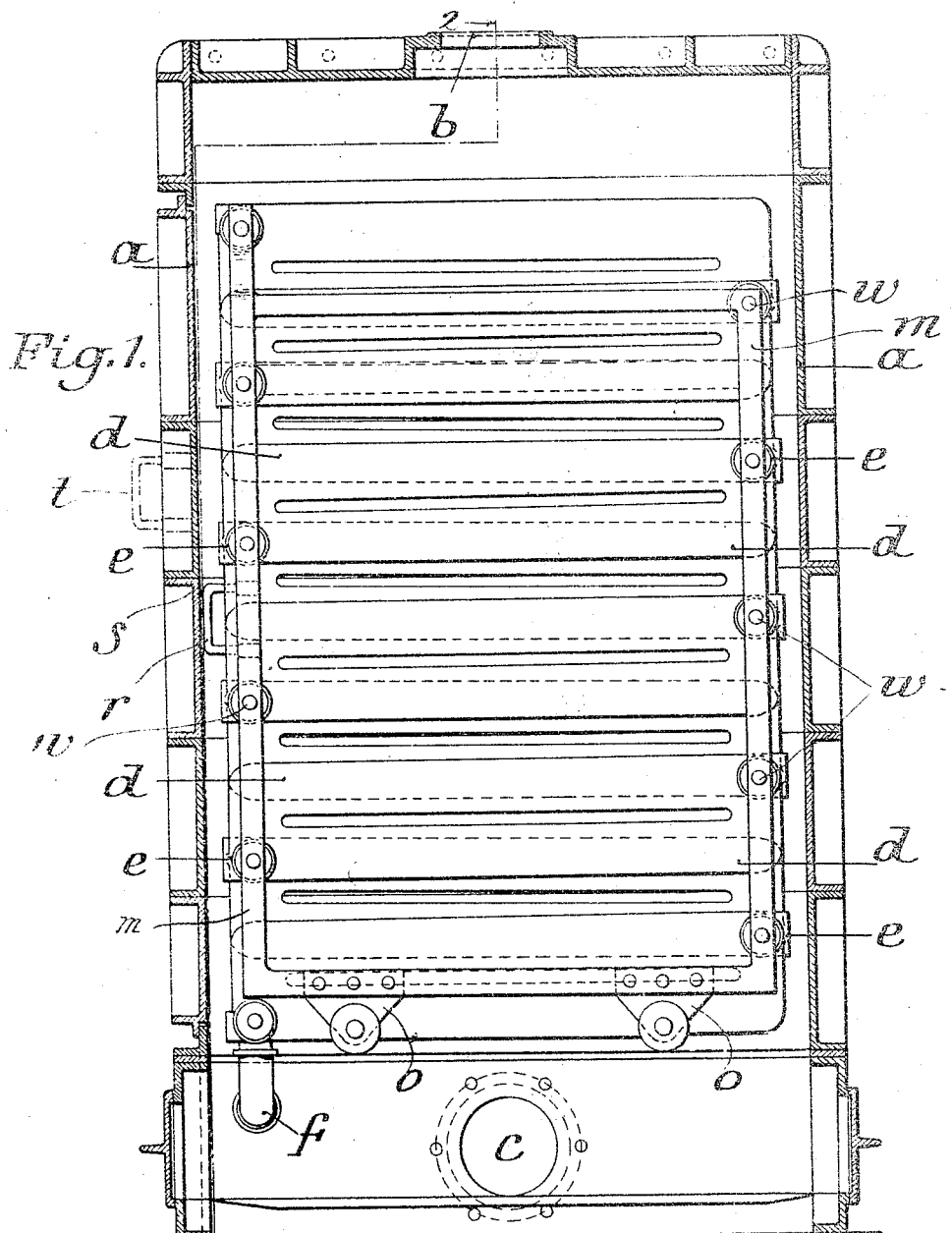

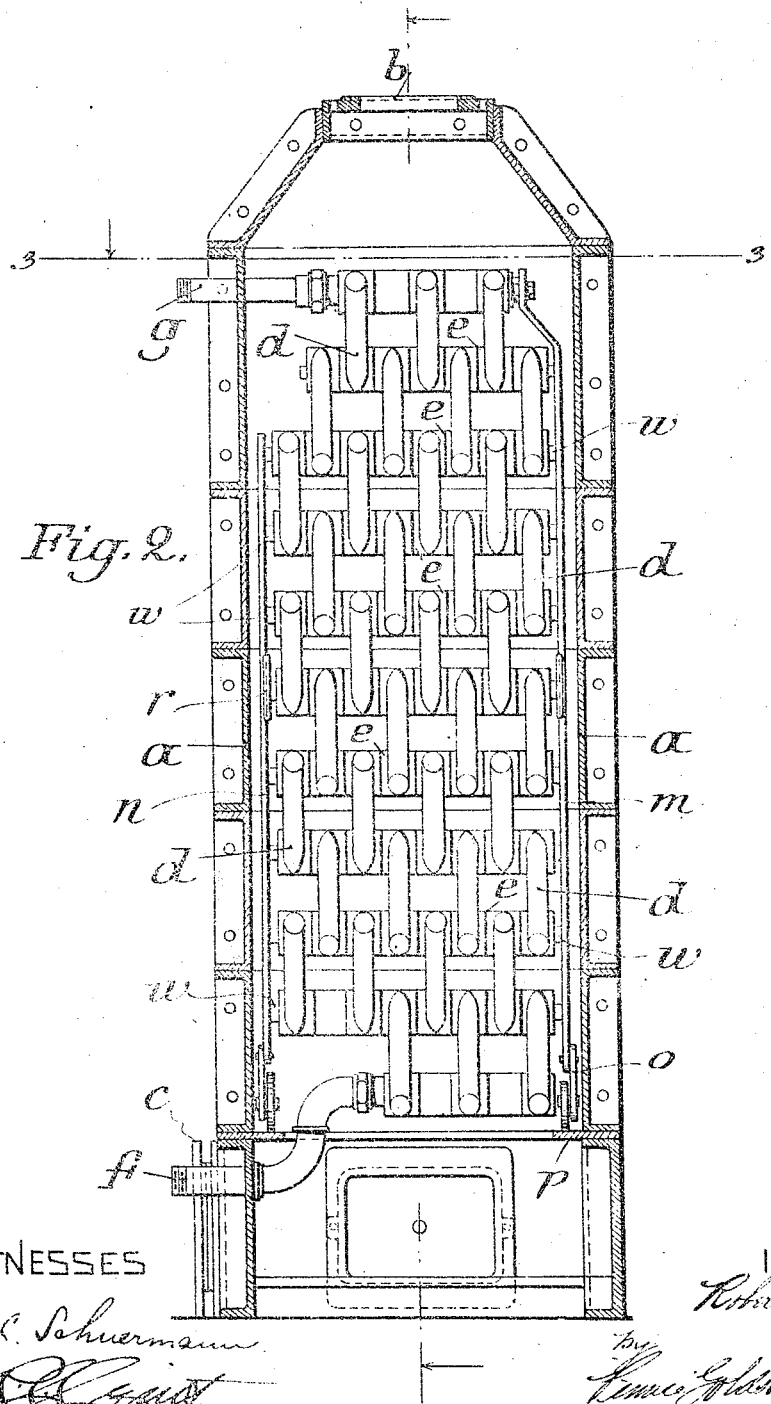

UNITED STATES PATENT OFFICE.

ROBERT SULZER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

HEATING APPARATUS.

1,083,343.  Specification of Letters Patent.  Patented Jan. 6, 1914.

Application filed March 4, 1911. Serial No. 612,241.

*To all whom it may concern:*

Be it known that I, ROBERT SULZER, engineer, a citizen of the Swiss Republic, residing at 34 Obere Haldenstrasse, Winterthur, Switzerland, have invented certain new and useful Improvements in Heating Apparatus; and I do hereby declare the following to be a full, clear, and exact description of the invention, such as will enable others skilled in the art to which it appertains to make and use the same.

This invention relates to heating apparatus employing the waste gases from an internal combustion engine.

It has frequently been suggested to utilize the waste gases of internal combustion engines for heating purposes, more particularly the waste gases from engines of the Diesel type. Hitherto in such apparatus the waste gases were brought into contact with coiled wrought iron tubes containing the water to be heated, which was subsequently employed in various ways, for instance to heat buildings on the hot water system. It has however been found that wrought iron tubes are corroded by the waste gases, and for that reason cast iron tubes were used, but difficulty then arises in providing a sufficiently large heating area in the comparatively small space usually available.

According to this invention the cast iron heat absorbing bodies of the heating apparatus are divided and connected in such a manner that a large heating surface can be arranged in a small space. To this end the heat exchange bodies, which are similar to those used as radiators in hot water heating apparatus, are arranged or connected together in a manner so as to form a chain.

A construction of apparatus according to this invention is illustrated in the accompanying drawing in which:—

Figure 1 is a central vertical longitudinal section through the casing, the heating elements therein being shown in elevation; Fig. 2 is a vertical section on the line 2—2 of Fig. 1; and Fig. 3 is a horizontal section on the line 3—3 of Fig. 2.

The apparatus comprises a casing $a$ into which the waste gases from the internal combustion engine are admitted at $b$ and from which they escape at $c$. A series of heat absorbing or exchange bodies $d$ is disposed within the casing, the members $d$ being shown of oblong elongated form similar to the usual cast iron radiators, but having the connecting branches $e$ of each member arranged diagonally opposite each other. By connecting the individual members by these branches, which may be swiveled on each other, a zig-zag, chain-like arrangement of the adjacent laterally overlapping members is obtained. In that way, it is possible to extend the whole chain of members to a greater or less extent, and thus to make the chain either long and narrow, or short and wide, according to the dimensions of the space available. Water is admitted into the series of members at $f$ and escapes from the same at $g$.

As will be seen in Fig. 2 each link of the chain is preferably compound, comprising a set of individual members arranged side by side in spaced relation, the members of the several sets being interjacent or entering between each other, with transverse communication between all the members at the alined swivel joints, whereby the current of water is divided into several streams thus improving the exchange of heat. Moreover, by the staggered relation between the several sets, the members of each set being opposite the spaces of the sets at opposite sides thereof and arranged transversely of the path of travel of the gases through the casing, valuable results are secured.

In the arrangement described there is no need to have intermediate unions or the like between the individual members or links and consequently the number of joints is reduced.

The heat exchange bodies are connected by transverse pivots $w$, which also connect them to a supporting frame, which is shown as consisting of two side frames $m$, $n$. The latter have wheeled supports $o$ at the bottom which enable the collection of bodies to be moved in and out of the casing, the wheels traveling on flanges $p$. The casing is provided at one end with a hinged door $s$ having a handle $t$, by means of which it may be swung open. The frames $m$, $n$ are likewise provided with handles $r$ for moving them in and out.

Having now particularly described and ascertained the nature of my said invention and in what manner the same is to be performed, I declare that what I claim is:

1. In a heating apparatus, the combination of a casing having an inlet and an outlet for hot gases and separate hollow adjacent heat exchange bodies, adapted to contain a liquid, arranged in a plurality of sets within the casing to form multiple paths for the liquid and pivotally connected together by connections transverse to the sets so as to constitute a chain for the purpose set forth.

2. A heating apparatus comprising a casing having an inlet and an outlet for the passage of hot gases therethrough, and hollow elongated liquid-circulating bodies in the casing connected in adjustable tortuous series by transverse swivel communications at their ends.

3. A heating apparatus comprising a casing having an inlet and an outlet for the passage of hot gases therethrough, and a series of hollow elongated liquid-circulating bodies in the casing, the several bodies being disposed transversely of the path of travel of the gases and the series being extended in the direction of such travel, the said bodies having swivel communicating connections at their ends affording a tortuous passage for the liquid and rendering said series adjustable as to length and width.

4. In a heat-exchange apparatus, a plurality of sets of hollow elongated heat-exchange bodies, each set consisting of bodies arranged side by side in spaced relation, the ends of the bodies of successive sets being interjacent each other and interconnected crosswise of the sets by swivel communications.

5. In a heating apparatus, the combination with a casing adapted to have hot gases passed therethrough, of a series of laterally overlapping hollow oblong bodies therein connected alternately at their opposite ends by transverse swivel communications within said casing affording a tortuous liquid passage and permitting adjustment of the dimensions of the series.

6. In a heat-exchange apparatus, the combination of a plurality of sets of hollow oblong heat-exchange bodies, each set consisting of bodies arranged side by side in spaced relation, the bodies of the several sets laterally overlapping between each other in staggered relation and being connected at the ends by swivel communications the axes of which are transverse to the sets.

7. In a heating apparatus, the combination of a series of laterally overlapping oblong hollow bodies, connected alternately at opposite ends by lateral swivel communications arranged diagonally in the individual bodies.

8. The combination with a casing adapted to have hot gases passed therethrough, of a plurality of sets of laterally overlapping oblong hollow liquid-circulating bodies therein connected at their ends by transverse swivel communications.

9. A heating apparatus comprising a casing adapted to have hot gases passed therethrough, and oblong hollow liquid-circulating bodies therein arranged in staggered sets the members of which enter between each other with integral lateral branches affording transverse intercommunication between the bodies of interjacent sets.

10. A heating apparatus, comprising a casing having an inlet and an outlet for the passage of hot gases therethrough, and elongated hollow liquid-circulating bodies therein arranged in sets, the bodies of successive sets entering between each other and the ends of the bodies of one set being directly connected to the interjacent bodies of the next set by communications disposed transversely of the sets.

11. In a heat exchange apparatus, a series of hollow oblong circulating bodies laterally overlapping each other and having alternating lateral communicating connections at their ends, said connections being diagonally related in the individual bodies.

12. Circulating means for heat-exchange apparatus, comprising a plurality of sets of hollow elongated heat-exchange bodies interleaving one with another, and connections arranged alternately at opposite ends of the sets and establishing communication transversely throughout the members of each set and between the members of interjacent sets, whereby a plurality of cross-connected tortuous passages are provided.

In testimony whereof I have affixed my signature, in presence of two witnesses.

ROBERT SULZER.

Witnesses:
CARL CUBLER,
AUGUST RÜEGG.